United States Patent
Sanchez et al.

(10) Patent No.: US 7,552,415 B2
(45) Date of Patent: Jun. 23, 2009

(54) METHOD AND SYSTEM FOR CREATING A CUSTOMIZED SUPPORT PACKAGE FOR AN FPGA-BASED SYSTEM-ON-CHIP (SOC)

(75) Inventors: Reno L. Sanchez, Albuquerque, NM (US); John H. Linn, Albuquerque, NM (US)

(73) Assignee: Xilinx, Inc., San Jose, CA (US)

( * ) Notice: Subject to any disclaimer, the term of this patent is extended or adjusted under 35 U.S.C. 154(b) by 1086 days.

(21) Appl. No.: 10/848,084

(22) Filed: May 18, 2004

(65) Prior Publication Data
US 2004/0210855 A1    Oct. 21, 2004

Related U.S. Application Data

(62) Division of application No. 10/082,440, filed on Feb. 22, 2002, now Pat. No. 6,754,882.

(51) Int. Cl.
*G06F 17/50* (2006.01)
(52) U.S. Cl. .............................. 716/16; 716/4
(58) Field of Classification Search ................. 716/4–6, 716/16–18; 323/38–39; 703/14–15; 718/102, 718/104; 719/321, 328, 331
See application file for complete search history.

(56) References Cited

U.S. PATENT DOCUMENTS

| | | | |
|---|---|---|---|
| 4,758,985 A | 7/1988 | Carter | |
| 4,855,669 A | 8/1989 | Mahoney | |
| 5,072,418 A | 12/1991 | Boutaud et al. | |
| 5,142,625 A | 8/1992 | Nakai | |
| RE34,363 E | 8/1993 | Freeman | |
| 5,274,570 A | 12/1993 | Izumi et al. | |
| 5,311,114 A | 5/1994 | Sambamurthy et al. | |
| 5,339,262 A | 8/1994 | Rostoker et al. | |
| 5,347,181 A | 9/1994 | Ashby et al. | |
| 5,361,373 A | 11/1994 | Gilson | |
| 5,457,410 A | 10/1995 | Ting | |

(Continued)

FOREIGN PATENT DOCUMENTS

EP    0315275 A2    10/1989

(Continued)

OTHER PUBLICATIONS

U.S. Appl. No. 09/858,732, filed May 15, 2001, Schultz.

(Continued)

*Primary Examiner*—Paul Dinh
(74) *Attorney, Agent, or Firm*—Pablo Meles; John J. King

(57) ABSTRACT

A method for customization of the software of an FPGA-based SoC includes the steps of selecting (380) a system component used for customizing the FPGA-based SoC, configuring (382) the selected system component with parameters for use with the FPGA-based SoC and propagating (384) the parameters used to configure the selected system component to peer system components. The method further includes the step of configuring (388) the peer system components using the propagated parameters during customization of the FPGA-based SoC and creating (401) a software interface to the selected system components and to the peer system components.

10 Claims, 5 Drawing Sheets

U.S. PATENT DOCUMENTS

| | | | |
|---|---|---|---|
| 5,473,267 A | 12/1995 | Stansfield | |
| 5,500,943 A | 3/1996 | Ho et al. | |
| 5,504,738 A | 4/1996 | Sambamurthy et al. | |
| 5,537,601 A | 7/1996 | Kimura et al. | |
| 5,543,640 A | 8/1996 | Sutherland et al. | |
| 5,550,782 A | 8/1996 | Cliff et al. | |
| 5,552,722 A | 9/1996 | Kean | |
| 5,574,930 A | 11/1996 | Halverson, Jr. et al. | |
| 5,574,942 A | 11/1996 | Colwell et al. | |
| 5,581,745 A | 12/1996 | Muraoka et al. | |
| 5,600,845 A | 2/1997 | Gilson | |
| 5,652,904 A | 7/1997 | Trimberger | |
| 5,671,355 A | 9/1997 | Collins | |
| 5,705,938 A | 1/1998 | Kean | |
| 5,732,250 A | 3/1998 | Bates et al. | |
| 5,737,631 A | 4/1998 | Trimberger | |
| 5,740,404 A | 4/1998 | Baji | |
| 5,742,179 A | 4/1998 | Sasaki | |
| 5,742,180 A | 4/1998 | DeHon et al. | |
| 5,748,979 A | 5/1998 | Trimberger | |
| 5,752,035 A | 5/1998 | Trimberger | |
| 5,760,607 A | 6/1998 | Leeds et al. | |
| 5,809,517 A | 9/1998 | Shimura | |
| 5,835,405 A | 11/1998 | Tsui et al. | |
| 5,874,834 A | 2/1999 | New | |
| 5,889,788 A | 3/1999 | Pressly et al. | |
| 5,889,990 A | 3/1999 | Coleman et al. | |
| 5,892,961 A | 4/1999 | Trimberger | |
| 5,914,616 A | 6/1999 | Young et al. | |
| 5,914,902 A | 6/1999 | Lawrence et al. | |
| 5,933,023 A | 8/1999 | Young | |
| 5,970,254 A | 10/1999 | Cooke et al. | |
| 6,011,407 A | 1/2000 | New | |
| 6,020,755 A | 2/2000 | Andrews et al. | |
| 6,026,481 A | 2/2000 | New et al. | |
| 6,034,542 A * | 3/2000 | Ridgeway | 326/39 |
| 6,096,091 A | 8/2000 | Hartmann | |
| 6,154,051 A | 11/2000 | Nguyen et al. | |
| 6,163,166 A | 12/2000 | Bielby et al. | |
| 6,172,990 B1 | 1/2001 | Deb et al. | |
| 6,178,541 B1 | 1/2001 | Joly et al. | |
| 6,181,163 B1 | 1/2001 | Agrawal et al. | |
| 6,211,697 B1 | 4/2001 | Lien et al. | |
| 6,242,945 B1 | 6/2001 | New | |
| 6,272,451 B1 | 8/2001 | Mason et al. | |
| 6,279,045 B1 | 8/2001 | Muthujumaraswathy et al. | |
| 6,282,627 B1 | 8/2001 | Wong et al. | |
| 6,301,696 B1 | 10/2001 | Lien et al. | |
| 6,311,149 B1 | 10/2001 | Ryan et al. | |
| 6,343,207 B1 | 1/2002 | Hessel et al. | |
| 6,353,331 B1 | 3/2002 | Shimanek | |
| 6,356,987 B1 | 3/2002 | Aulas | |
| 6,389,558 B1 | 5/2002 | Herrmann et al. | |
| 6,434,735 B1 | 8/2002 | Watkins | |
| 6,460,172 B1 | 10/2002 | Insenser Farre et al. | |
| 6,467,009 B1 | 10/2002 | Winegarden et al. | |
| 6,483,342 B2 | 11/2002 | Britton et al. | |
| 6,507,942 B1 | 1/2003 | Calderone et al. | |
| 6,510,548 B1 | 1/2003 | Squires | |
| 6,518,787 B1 | 2/2003 | Allegrucci et al. | |
| 6,519,753 B1 | 2/2003 | Ang | |
| 6,522,167 B1 | 2/2003 | Ansari et al. | |
| 6,532,572 B1 | 3/2003 | Tetelbaum | |
| 6,539,508 B1 | 3/2003 | Patrie et al. | |
| 6,539,522 B1 * | 3/2003 | Devins et al. | 716/5 |
| 6,541,991 B1 | 4/2003 | Hornchek et al. | |
| 6,578,174 B2 | 6/2003 | Zizzo | |
| 6,581,191 B1 | 6/2003 | Schubert et al. | |
| 6,587,995 B1 | 7/2003 | Duboc et al. | |
| 6,588,006 B1 | 7/2003 | Watkins | |
| 6,601,227 B1 | 7/2003 | Trimberger | |
| 6,604,228 B1 | 8/2003 | Patel et al. | |
| 6,611,951 B1 | 8/2003 | Tetelbaum et al. | |
| 6,754,882 B1 | 6/2004 | Sanchez et al. | |
| 6,996,796 B2 | 2/2006 | Sanchez et al. | |
| 2001/0049813 A1 | 12/2001 | Chan et al. | |
| 2002/0010902 A1 * | 1/2002 | Chen et al. | 716/16 |
| 2002/0072893 A1 | 6/2002 | Wilson | |
| 2003/0014521 A1 * | 1/2003 | Elson et al. | 709/225 |
| 2003/0062922 A1 | 4/2003 | Douglass et al. | |
| 2004/0138845 A1 * | 7/2004 | Park et al. | 702/108 |
| 2004/0218414 A1 * | 11/2004 | Hamlin | 365/145 |
| 2007/0005327 A1 * | 1/2007 | Ferris | 703/14 |

FOREIGN PATENT DOCUMENTS

| | | |
|---|---|---|
| EP | 0 905 906 A2 | 3/1999 |
| EP | 1 235 351 A1 | 8/2002 |
| WO | WO 93 25968 A1 | 12/1993 |
| WO | WO 01/44934 A1 | 6/2001 |
| WO | WO 02/08888 A2 | 1/2002 |

OTHER PUBLICATIONS

U.S. Appl. No. 09/861,112, filed May 18, 2001, Dao et al.
U.S. Appl. No. 09/917,304, filed Jul. 27, 2001, Douglass et al.
U.S. Appl. No. 09/968,446, filed Sep. 28, 2001, Douglass et al.
U.S. Appl. No. 09/991,410, filed Nov. 16, 2001, Herron et al.
U.S. Appl. No. 09/991,412, filed Nov. 16, 2001, Herron et al.
U.S. Appl. No. 10/001,871, filed Nov. 19, 2001, Douglass et al.
U.S. Appl. No. 10/043,769, filed Jan. 9, 2002, Schultz.
U.S. Appl. No. 10/082,441, filed Feb. 22, 2002, Hwang et al.
U.S. Appl. No. 10/082,517, filed Feb. 22, 2002, Sanchez et al.
U.S. Appl. No. 10/082,518, filed Feb. 22, 2002, Hwang et al.
Cary D. Snyder and Max Baron; "Xilinx's A-to-Z System Platform"; Cahners Microprocessor; The Insider's Guide to Microprocessor Hardware; Microdesign Resouces; Feb. 6, 2001; pp. 1-5.
Sayfe Kiaei et al.; "VLSI Design of Dynamically Reconfigurable Array Processor-DRAP," IEEE, Feb. 1989; V3.6, IEEE, 3 Park Avenue, 17th Floor, New York, NY 10016-5997; pp. 2484-2488.
Vason P. Srini; "Field Programmable Gate Array (FPGA) Implementation of Digital Systems: An Alternative to ASIC," IEEE, May 1991; IEEE, 3 Park Avenue, 17th Floor, New York, NY 10016-5997; pp. 309-314.
G. Maki et al.; "A Reconfigurable Data Path Processor"; IEEE, Aug. 1991; IEEE, 3 Park Avenue, 17th Floor, New York, NY 10016-5997; pp. 18-4.1 to 18-4.4.
Jacob Davidson; "FPGA Implementation of Reconfigurable Microprocessor"; IEEE, Mar. 1993; IEEE, 3 Park Avenue, 17th Floor, New York, NY 10016-5997; pp. 3.2.1-3.2.4.
Christian Iseli et al.; "Beyond Superscaler Using FPGA's"; IEEE, Apr. 1993; IEEE, 3 Park Avenue, 17th Floor, New York, NY 10016-5997; pp. 486-490.
P.C. French et al.; "A Self-Reconfiguring Processor"; IEEE, Jul. 1993; IEEE, 3 Park Avenue, 17th Floor, New York, NY 10016-5997; pp. 50-59.
Christian Iseli et al.; "SPYDER: A Reconfigurable VLIW Processor Using FPGA's"; IEEE, Jul. 1993; IEEE, 3 Park Avenue, 17th Floor, New York, NY 10016-5997; pp. 17-24.
Michael J. Wirthlin et al.; "The NANO Processor: A Low Resource Reconfigurable Processor"; IEEE, Feb. 1994; IEEE, 3 Park Avenue, 17th Floor, New York, NY 10016-5997; pp. 23-30.
William S. Carter; "The Future of Programmable Logic and Its Impact on Digital System Design"; Apr. 1994; IEEE; 3 Park Avenue, 17th Floor, New York, NY 10016-5997; pp. 10-16.
Andre' DeHon; "DPGA-Coupled Microprocessors: Commodity ICs For The Early 21st Century"; Feb. 1994; IEEE; 3 Park Avenue, 17th Floor, New York, NY 10016-5997; pp. 31-39.
Osama T. Albaharna; "Area & Time Limitations of FPGA-Based Virtual Hardware"; IEEE,; Apr. 1994; 3 Park Avenue, 17th Floor, New York, NY 10016-5997; pp. 184-189.
Xilinx, Inc., "The Programmable Logic Data Book"; 1994; Revised 1995; available from Xilinx, Inc., 2100 Logic Drive, San Jose, CA. 95124.

Christian Iseli et al.; "AC++ Compiler for FPGA Custom Execution Units Synthesis"; 1995; IEEE, 3 Park Avenue, 17th Floor, New York, NY 10016-5997; pp. 173-179.

International Business Machines; "POWERPC 405 Embedded Processor Core User Manual"; 1996; 5th Ed..; International Business Machines; 1580 Rout 52, Bldg. 504, Hopewell Junction, NY 12533-6531; pp. 1-1 to X-16.

Yamin Li et al.; "AIZUP-A Piplined Processor Design & Implementation on Xilinx FPGA Chip"; IEEE; Sep. 1996; IEEE; 3 Park Avenue, 17th Floor, New York, NY 10016-5997; pp. 98-106.

Ralph D. Wittig et al.; ONECHIP: An FPGA Processor with Reconfigurable Logic; Apr. 17, 1996; , IEEE, 3 Park Avenue, 17th Floor, New York, NY 10016-5997; pp. 126-135.

Xilinx, Inc.; "The Programmable Logic Data Book"; Jan. 27, 1999; Ch. 3; , availabel from Xilinx, Inc., 2100 Logic Drive, San Jose, CA 95124; pp. 3-1 to 3-50.

William B. Andrew et al.; "A Field Programmable System Chip which Combines FPGA & ASIC Circuitry"; IEEE,; May 16, 1999; IEEE; 3 Park Avenue, 17th Floor, New York, NY 10016-5997; pp. 183-186.

Xilinx, Inc., "The Programmable Logic Data Book"; 2000; Ch. 3; available from Xilinx, Inc., 2100 Logic Drive, San Jose, CA 95124; pp. 3-1 to 3-117.

International Business Machines; "Processor Local Bus"; Architecture Specifications; 32-Bit Implementation; Apr. 2000; First Edition; V2.9; IBM Corporation, Department H83A, P.O. Box 12195, Research Triangle Park, NC 27709; pp. 1-76.

Xilinx, Inc., Virtex II Platform FPGA Handbook; Dec. 6, 2000; v1.1; available ffrom Xilinx, Inc., 2100 Logic Drive, San Jose, CA. 95124; pp. 33-75.

Microsoft Corporation; "Microsoft Windows CE Platform Builder 3.0: Getting Started"; May 2000; Microsoft MSDN Website; pp. 1-21.

Neugass, H. et al.; "VxWorks: An Interactive Development Environment and Real-Time Kernel for Gmicro"; TRON Project Symposium; 1991; Proceedings, Eight Tokyo, Japan Nov. 21-27, 1991; IEEE Computer Soc.; pp. 197-198.

* cited by examiner

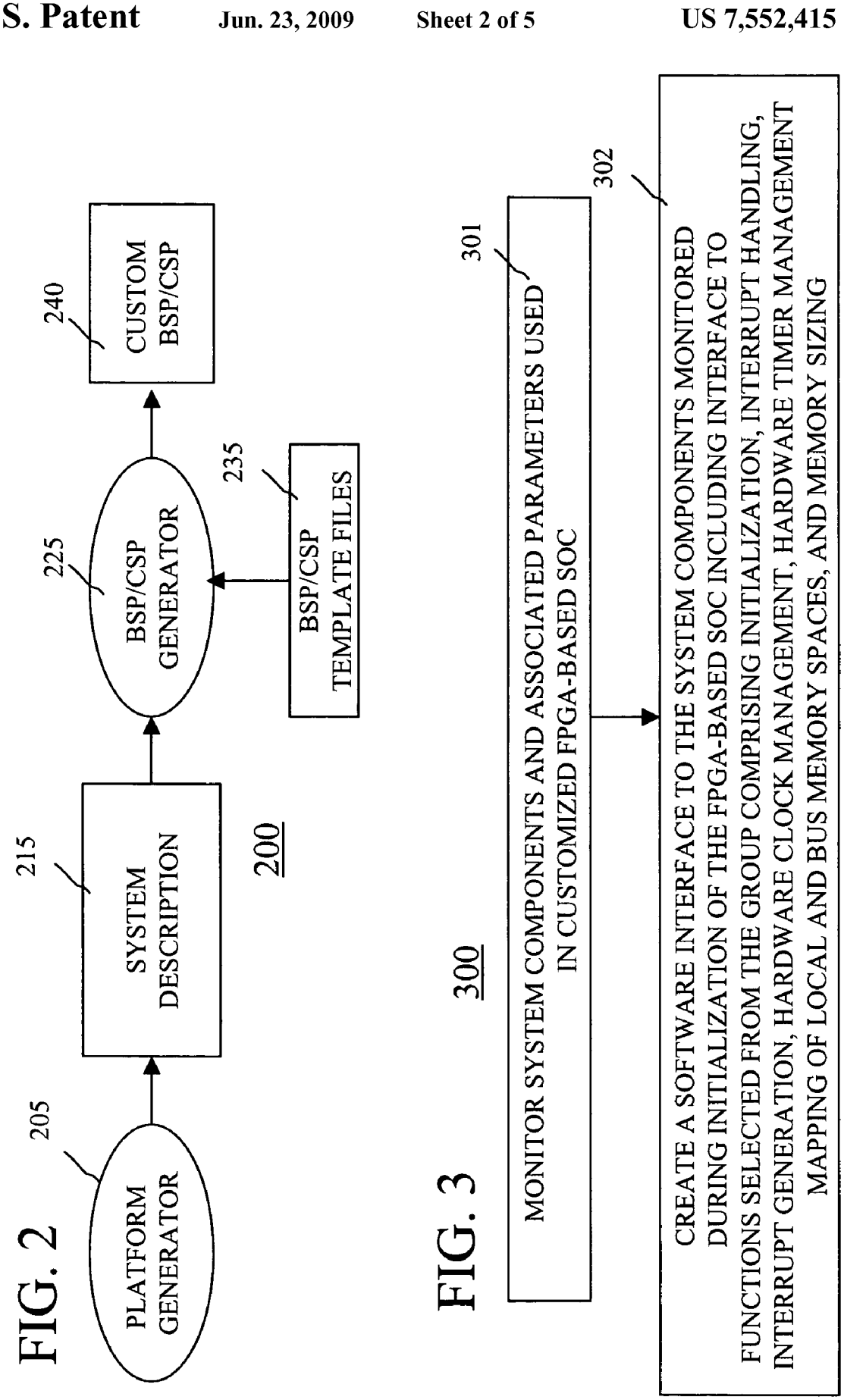

METHOD AND SYSTEM FOR CREATING A CUSTOMIZED SUPPORT PACKAGE FOR AN FPGA-BASED SYSTEM-ON-CHIP (SOC)

FIELD OF THE INVENTION

This invention relates generally to programmable logic devices, and more particularly to a method and system for creating support packages for customized FPGA-based SoCs.

BACKGROUND OF THE INVENTION

Programmable devices are a class of general-purpose integrated circuits that can be configured for a wide variety of applications. Such programmable devices have two basic versions, mask programmable devices, which are programmed only by a manufacturer, and field programmable devices, which are programmable by the end user. In addition, programmable devices can be further categorized as programmable memory devices or programmable logic devices. Programmable memory devices include programmable read only memory (PROM), erasable programmable read only memory (EPROM) and electronically erasable programmable read only memory (EEPROM). Programmable logic devices include programmable logic array (PLA) devices, programmable array logic (PAL) devices, erasable programmable logic devices (EPLD) devices, and programmable gate arrays (PISA).

As chip capacity continues to increase significantly, the use of field programmable gate arrays (FPGAs) is quickly replacing the use of application specific integrated circuits (ASICs). An ASIC is a specialized integrated circuit that is designed for a particular application and can be implemented as a specialized microprocessor. Notably, an FPGA is a programmable logic device (PLD) that has an extremely high density of electronic gates as compared to an ASIC. This high gate density has contributed immensely to the popularity of FPGAs. Notably, FPGAs can be designed using a variety of architectures that can include user configurable input/output blocks (IOBs), and programmable logic blocks having configurable interconnects and switching capability.

The advancement of computer chip technology has also resulted in the development of embedded processors and controllers. An embedded processor or controller can be a microprocessor or microcontroller circuitry that has been integrated into an electronic device as opposed to being built as a standalone module or "plugin card." Advancement of FPGA technology has led to the development of FPGA-based system-on-chips (SoC) including FPGA-based embedded processor system-on-chips. A SoC is a fully functional product having its electronic circuitry contained on a single chip. While a microprocessor chip requires ancillary hardware electronic components to process instructions, a SoC would include all required ancillary electronics. For example, a SoC for a cellular telephone can include a microprocessor, encoder, decoder, digital signal processor (DSP), RAM and ROM. It should be understood within contemplation of the present invention that an FPGA-Based SoC does not necessarily include a microprocessor or microcontroller. For example, a SoC for a cellular telephone could also include an encoder, decoder, digital signal processor (DSP), RAM and ROM that rely on an external microprocessor. It should be understood herein that "FPGA-based embedded processor SoCs" are a specific subset of FPGA-based SoCs that would include their own processors.

In order for device manufacturers to develop FPGA-based SoCs or FPGA-based embedded processor SoCs, it is necessary for them to acquire intellectual property rights for system components and/or related technologies that are utilized to create the FPGA-based SoCs. These system components and/or technologies are called cores or Intellectual Property (IP) cores. An electronic file containing system component information can typically be used to represent the core. A device manufacturer will generally acquire several cores that are integrated to fabricate the SoC.

Notwithstanding advantages provided by using FPGA-based SoCs, the development of these SoCs can be very challenging. Although a vast proportion of cores are commercially available, a significantly greater proportion of cores are proprietary. Proprietary cores can be called customer specific cores. Commercially available cores can typically include standardized interfaces, which can provide interconnectivity between system components from various vendors. Customer specific cores can typically include proprietary interfaces that do not readily facilitate interconnectivity between system components from other vendors. For example, customer specific cores can be written in proprietary languages, which are completely different from standardized languages. Since customer specific cores do not readily facilitate interconnectivity with other vendor's system components, integrating customer specific cores during customization of an FPGA-based SoC can be time consuming. This resulted in increased development cost and greater time-to-market. Integration of the cores can include simulating, modeling and debugging the integrated cores in an operating environment. Simulation and modeling can be a daunting task since it can take hours if not days to simulate a few milliseconds of real time operation. FPGA based embedded processor SoCs are being introduced into the market, but there are no solutions which allow users to customize the system, the hardware cores, and the associated software nor is there a system enabling a user to tradeoff between a function which is implemented in hardware (FPGA fabric) or software (running on the embedded processor). It would be desirable to have a method and system for better integrating cores during customization of FPGA-based SoCs. After a system is customized with cores for an FPGA-based SoC, a software interface to a circuit board is needed. Traditionally, a Board Support Package (BSP) provided this software interface to a fixed entity (the circuit board) and included a collection of libraries which isolated all hardware specific functionality from the software. In the case of an FPGA-based SoC, a more dynamic solution is needed since the FPGA-based SoC is a much more dynamic environment than the traditional circuit board. Thus, a need exists for a software framework that supports the dynamic nature of customized FPGA-based SoCs.

SUMMARY OF THE INVENTION

In a first aspect, the present invention can provide a method for customization of the software of an FPGA-based SoC. Subsequent to selecting a system component used for customizing the FPGA-based SoC, parameters can be used to configure the selected system component for use with the FPGA-based SoC. The parameters used to configure the selected system component can be propagated and used to configure peer system components. Notably, other parameters that are used to configure the peer system component can also be propagated and used to configure the selected system component. The parameters used to configure the peer system components can be propagated to subsequently selected system components that can be used to configure the FPGA-based SoC. The method further comprises the step of creating a software interface to the selected system component or components and to the peer system components. Selection of the system components can also include the provision of an option for selecting a hardware implementation or a software implementation for customizing the FPGA-based SoC. Additionally, the step of selecting the system component can include selecting a system component from the group consisting of a hardware core and a software core.

In another aspect of the present invention, a method of generating a chip support package for a customized FPGA-based SoC can comprise the step of monitoring during initialization of the customized FPGA-based SoC for at least one system component and associated parameters among a plurality of system components used for customizing the customized FPGA-based SoC and the step of creating a software interface based on the system components and associated parameters monitored.

In yet another aspect of the present invention, a support package generator for an FPGA-based system-on-chip (SoC) comprises a software interface having access to a collection of software component libraries for supporting functions of a customized FPGA-based SoC and a self contained directory specifying directory locations for items selected from the group comprising an output of the support package generator, a chip support package template file, a software device driver file.

The support package generator can also include software interface that serves as a software interface to hardware functions selected from the group comprising hardware initialization, interrupt handling, interrupt generation, hardware clock management, hardware timer management, mapping of local and bus memory spaces, and memory sizing.

BRIEF DESCRIPTION OF THE DRAWINGS

FIG. 2 depicts an exemplary topological view of a system model for generating a customized support package in accordance with the inventive arrangements.

FIG. 3 depicts a flow chart illustrating exemplary steps for creating a customized support package in accordance with the invention.

DETAILED DESCRIPTION OF THE DRAWINGS

Figure 1:
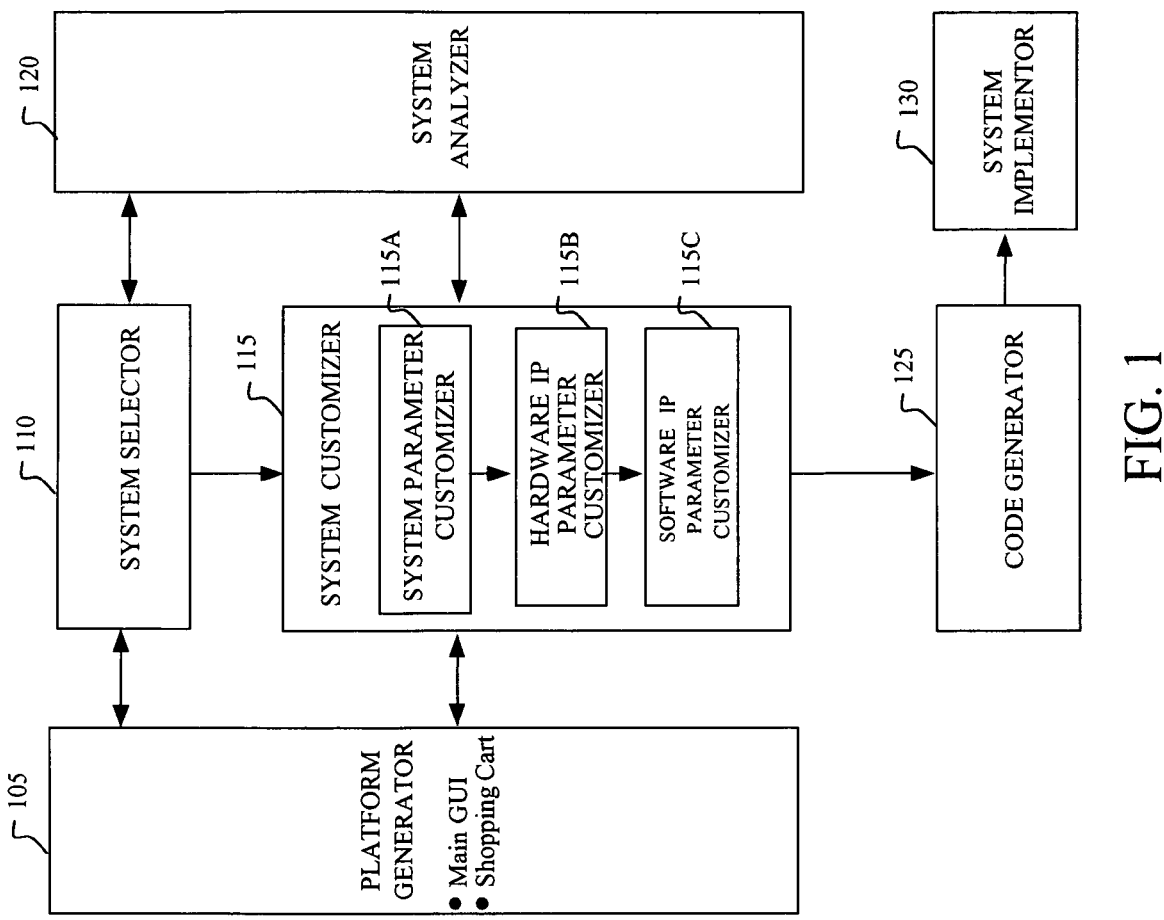
FIG. 1 is a block diagram of a processor system generator in accordance with the invention.

Referring to FIG. 1, there is shown a block diagram illustrating an exemplary system for developing and verifying a FPGA-based SoC in accordance with the invention. For illustrative purposes, and without limiting the scope of the invention, an embedded system consisting of a microprocessor, buses, memory architecture, peripherals, and software components is presented, although a system using an external microprocessor is certainly contemplated within the scope of the invention. Exemplary software components for the embedded system can include, but is not limited to, device drivers and system software, such as a real time operating system (RTOS) and protocol stacks. An exemplary development environment for this embedded system can include, but is not limited to, one or more libraries for microprocessors, peripherals, system software, and device drivers. The relevant bus architectures and memory options that can be utilized for the development of an FPGA-based SoC can be included in the libraries. Further, a good example of hardware/software function tradeoff can involve the protocol stack, which can be implemented in either hardware or software. A user may implement a protocol stack in software if there is sufficient processing power to meet all performance requirements or the user could implement the protocol stack in hardware given sufficient FPGA resources and a presumed need for higher performance.

In general, a system model can be created to facilitate design and testing of a FPGA-based SoC. The system model can include a data structure that represents the internal structure and functionality of the FPGA-based SoC. The system model can include, but is not limited to, system components, interconnections between components, and attributes, which define various characteristics and functionality of the system components and interconnections. The data structure can be a hierarchical structure, for example a tree structure, which can mirror the design hierarchy of the embedded system. This system model can also include algorithms, which can facilitate selection and customization of system components. Notably, the system model can be part of an integrated object-oriented system (OOS) that can facilitate selection and customization of the system components. Alternatively, other mechanisms and algorithms external to the system model can facilitate selection and customization of the system components.

Referring now to FIG. 1, there are shown a platform generator 105, a system selector 110, a system customizer 115, a system analyzer 120, a code generator 125 and a system implementor 130 all forming a processor system generator. The platform generator 105 can include one or more GUIs that can facilitate design of the system model. A main GUI can provide various system options and informational dialogs. The platform generator can include, a navigator GUI having one or more dialogs and/or objects, a topological GUI having one or more dialogs and/or objects and a selection customizer GUI having one or more dialogs and/or objects. One or more dialogs and/or objects can provide system component resource counts, performance estimates, power requirements and system and application software requirements. For example, a GUI can be used to display a table or chart representing the resource allocation for the system components. Advantageously, such table or chart can provide an easily readable condensed view of the system resource allocation. An exemplary table is illustrated below.

| Device | LUTs | DFFS | Slices | BRAM | I/Os |
|---|---|---|---|---|---|
| OPB Arbiter | 300 | 200 | 200 | 0 | 9 |
| UART 16450 | 500 | 400 | 300 | 0 | 12 |
| Ethernet 10/100 M | 2500 | 1700 | 1500 | 0 | 12 |
| Total Utilized | 3300 | 2300 | 2000 | 0 | 21 |
| Device Resources | 122880 | 122880 | 61440 | 3456 | 1488 |
| Available Resources | 119580 | 120580 | 59440 | 3456 | 1267 |

Referring to the table, a condensed view of the system resources is provided. Specifically, the table shows a breakdown of particular resources utilized by each device and also the total resources utilized by all devices. The available resources can be computed based on the total utilized resources and the total device resources. For example, there are 122880 D-flip flops (D-FFs) available. OPB arbiter utilizes 200 D-FFs, UART 16450 utilizes 400 D-FFs, and Ethernet 10/100M device utilizes 1700 D-FFS. Hence, there are 2300 D-FFs utilized, which leaves 120580 available.

A navigator dialog and/or object can provide an interactive interface that can facilitate viewing of design specification and configuration information. For example, one or more navigator objects can provide a graphical view to facilitate the insertion of a microprocessor from a library into the system model. In a case where a universal asynchronous receiver/transmitter (UART) is selected as a peripheral, the navigator object and/or dialog can permit customization of the UART. The navigator dialog can also be configured to permit switching between multiple design and implementation tasks. The topological dialog can utilize a block diagram format to provide a topological view that can visually represent the existing state of the system model. The selection customizer object can permit the selection and customization of a system component. Upon selection of a system component, a GUI which can include a dialog, can facilitate customization of the system component. Platform generator 105 can have the capability to permit a particular state and/or stage of the system design and implementation to be saved and recalled at a subsequent time.

System selector 110 can be a GUI that can facilitate selection of the system components that can be used to design the FPGA-based SoC. For example, the system selector 110 can provide one or more dialogs that can permit the selection of microprocessors, microcontrollers, peripheral devices, buses, system software and application software. During selection of system components, each of the selected components can be independently treated.

The system customizer 115 can include one or more GUIs having objects and/or dialogs that can facilitate customization or configuration of system components and software. Referring to FIG. 1, there are shown a system parameter customizer 115a, a hardware intellectual property (IP) parameter customizer 115b, and a software IP parameter customizer 115c. The system parameter customizer 115a can facilitate customization of the memory map, interrupt bindings and priorities, and global and default system parameter definitions. The hardware intellectual property (IP) parameter customizer 115b can facilitate customization of device specific parameters. For example, data bus widths, IP interfaces and device specific parameters can be customized by hardware intellectual property (IP) parameter customizer 115b.

The software intellectual property (IP) parameter customizer 115c can facilitate customization of software specific parameters. For example, upon selection of a system component or a peripheral, an interrupt request (IRQ) number, a memory mapped I/O address and default initialization parameters can be assigned to the peripheral by the software IP parameter customizer 115c. In a case where a UART has been selected as a peripheral, default parameters can include, but are not limited to, stop bits, parity designation on/off, and baud rate. The customizer system 115 not only provides selection of the system components, but can also be configured to bind system parameters to system components. For example, the memory map for a particular peripheral can be bound to the peripheral giving the peripheral its unique memory address space. Furthermore, a GUI having one or more dialogs can be used to populate a system model data structure with customization parameters and/or attributes.

The system analyzer 120 can include one or more GUIs having objects and/or dialogs that can provide immediate feedback regarding architectural choices made during customization. The system analyzer 120 can include software that can have the capability to validate and analyze the system model while it is being customized. If problems including, incompatibilities, conflicts and/or system violations occur, the system analyzer 120 can issue immediate warnings and/or provide possible solutions. The system analyzer 120 can perform tasks such as system checks, parameter consistency checks, data type and value propagation checks, interconnection inference, and resource and performance analysis. Interconnection reference pertains to implications that can result from making certain connections. The system analyzer 120 can also assign device identifications (IDs) to system components and computing configuration read-only-memory (ROM) data. Exemplary system and parameter consistency checks can include, matching data bus widths of peripherals and system components, determining interrupt conflicts, determining memory map conflicts, determining memory size and usage, determining device counts, determining availability of FPGA resources and determining maximum operating frequency.

The system analyzer 120 can be configured to propagate default values, global values and/or previously defined values through the system model. For example, if a bus is configured with a default data width of 16 bits, then each peripheral that "sits on" or utilizes that bus can automatically be configured with a data width of 16 bits. It should be recognized by one skilled in the art that although a peripheral device may be automatically configured with the default bus width value, this value can be overwritten. For example, depending on the application, availability of certain devices can dictate that two (2) 8-bit devices be utilized instead of a single 16-bit device. Advantageously, the propagation of values can prevent multiple entry of similar data which typically increases development time.

During performance analysis, system analyzer 120 can have the capability to determine if system components are properly configured. For example, system analyzer 120 can identify a high-speed device that has not been configured with direct memory access (DMA). Since such a device can invariably cause a system conflict, system analyzer can consider it as a source of potential problem. System analyzer 120 can also determine whether there are too many devices residing on a bus based on the device count. For example, the system analyzer 120 can have the capability to determine whether there are too many high-speed devices on a low speed bus. In this case, the system analyzer 120 can indicate the possibility of errors and/or generate possible solutions. By tracking memory usage, the system analyzer 120 can have the capability to determine whether the code space assigned in the memory map is too large for the physical memory. System analyzer 120 can also be configured to track physical resource requirements for example, slice counts for IP blocks, and width and height of specifications of IP blocks. A GUI can provide a visual display of a resulting or representative floor plan to aid with tracking and management of physical resources.

Code generator 125 can include one or more GUIs having objects and/or dialogs that can facilitate generation of the code necessary for implementing the design of the FPGA-based embedded processor SoC or FPGA-based SOC. The code necessary for implementing the design of the FPGA-based SoC can be in a format such as the well known hardware description language (HDL). HDL is a language used to describe the functions of an electronic circuit for documentation, simulation and/or logic synthesis. Verilog and VHSIC Hardware Description Language (VHDL) are standardized HDLs which are well known by those skilled in the art.

Verilog and VHDL can be used to design electronic systems at the component, board and system level. They can facilitate the development of models at a very high level of abstraction. Other formats now known or to be discovered can also be used to represent the system model.

Depending on information generated by, for example, the software IP parameter customizer 115c, the code generator 125 can tailor "header files," which can be used to implement the software IP of the FPGA-based SoC. Moreover, depending on the selected software IP, processors, peripherals, operating system and device drivers, code generator 125 can produce a source code directory structure that can facilitate implementation of the software IP of the FPGA-based SoC. The code generator 125 can also generate the necessary "make files," which can be used to define the rules necessary for compiling and building the code used to implement the software IP of the FPGA-based SoC. The code generator 125 can be configured to generate information that can be used for debugging. The generated information can be in an ASCII format or other suitable format and can include information such as the memory map, the configuration ROM table and the peripheral ID map.

The system implementor 130, can include one or more GUIs that can have objects and/or dialogs that can facilitate implementation of the FPGA-based SoC design. Implementation of the design can include, but is not limited to, HDL simulation and synthesis, mapping of information generated by the code generator 125, placement, routing and bitstream generation. An integrated tool or separate tools can facilitate the implementation of the FPGA-based SoC design.

FIG. 2 depicts a functional flow chart analogous to the block diagram and hardware description of FIG. 1. The BSP/CSP generator 225 preferably serves as a tool for automating the creation of a BSP and/or CSP based on a customized FPGA-based SoC such as Xilinx's FPGA-based embedded processor SoC. The BSP would contain all the necessary support software for a customized system, including boot code, device drivers, and RTOS initialization. The generator 225 preferably takes as input a system description 215 that is preferably created using a platform generator 205 similar to the platform generator 105 previously described with respect to FIG. 1. Using the system description 215 along with BSP (or CSP) template files 235, the generator 225 produces a directory structure containing a customized BSP and/or CSP 240. Every operating system supported by the generator 225 can have a corresponding set of template files. If necessary, the user (such as a developer) can further tailor the BSP/CSP 240 to meet specific needs such as off-chip device support as well as add application-level software. Thus, the directory generated will generally contain canned BSP files for the operating system and specific processor (in the case of a FPGA-based embedded processor SoC) as well as customized BSP files that are BSP template files modified by the generator 225 to reflect the actual system just created by the platform generator 205. These templates can include makefiles used to build the BSP. Additionally, the directory will contain software device driver files for peripherals included in the system description.

With respect to the directory (and corresponding directory tree) produced by the generator 225, it is preferable that BSP/CSP directory be self-contained to enable easy portability to any other user directory based on the needs of their operating system development tools. Besides names for the BSP and associated CSPs, a directory tree (as explained above) would further contain device driver software and associated makefiles. Preferably, only those device drivers actually used in the system is copied (from a repository created by the Platform Generator 205 for example) to the directory tree. Rather than create a BSP that points (e.g. in makefiles) to the driver repository, the necessary driver files are copied to the BSP directory to create a self-contained BSP. An XML tag format will allow for more than one CSP to be included in a single BSP such as in the case where two or more FPGAs exist on a single board or where two or more processors exist within a single FPGA.

Referring to FIG. 3, a flow chart illustrating a method of creating a support package for a customized FPGA-based SoC is shown. The method preferably comprises the step of monitoring for at least one system component and associated parameters among a plurality of system components used for customizing the customized FPGA-based SoC during initialization of the customized FPGA-based SoC and the step of creating a software interface based on the system components and associated parameters monitored. The step of monitoring can involve analysis of system descriptors as previously described. The step of creating can involve the automatic generation of a software interface to hardware functions selected from the group comprising hardware initialization, interrupt handling, interrupt generation, hardware clock management, hardware timer management, mapping of local and bus memory spaces, and memory sizing.

Figure 4:
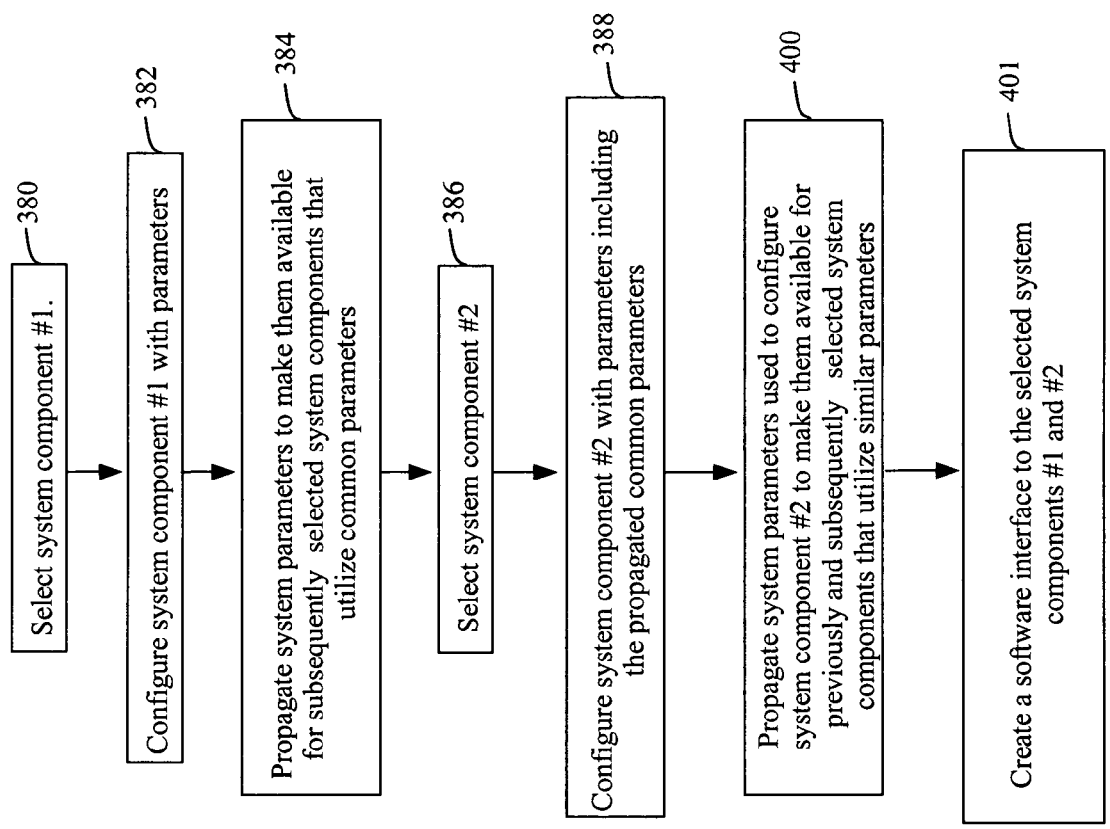
FIG. 4 depicts a flow chart illustrating a method of customizing an FPGA-based SoC.

FIG. 4 depicts a flow chart illustrating exemplary steps for creating support packages in accordance with the invention. Referring to FIG. 4, in step 380, system component #1 can be selected. System component #1 and any subsequently selected system component can include a hardware core or a software core. In step 382, system component #1 can be configured with parameters. In step 384, the system parameters can be propagated to make them available for subsequently selected system components that will utilize common parameters. In step 384, system component #2 can be selected. In step 388, system component #2 can be configured with parameters including previously propagated common parameters. In step 400, any new parameters that were used to configure system component #2 can be propagated to make them available for previously and subsequently selected system components that utilize similar parameters. At step 401, a software interface to the selected components and any peer components are created.

It should be recognized by those skilled in the art that the configuration and propagation of parameters can be static or dynamic. Notably, as system components are configured with new parameters, these new parameters are propagated and made available for configuring other system components. Importantly, these other system components can include previously configured hardware and software system components, as well as subsequently selected hardware and software system components. Advantageously, the propagation of system parameters can save on development time, since it can obviate any need to re-enter similar parameters which can be used to configure other selected system components.

Figure 5:
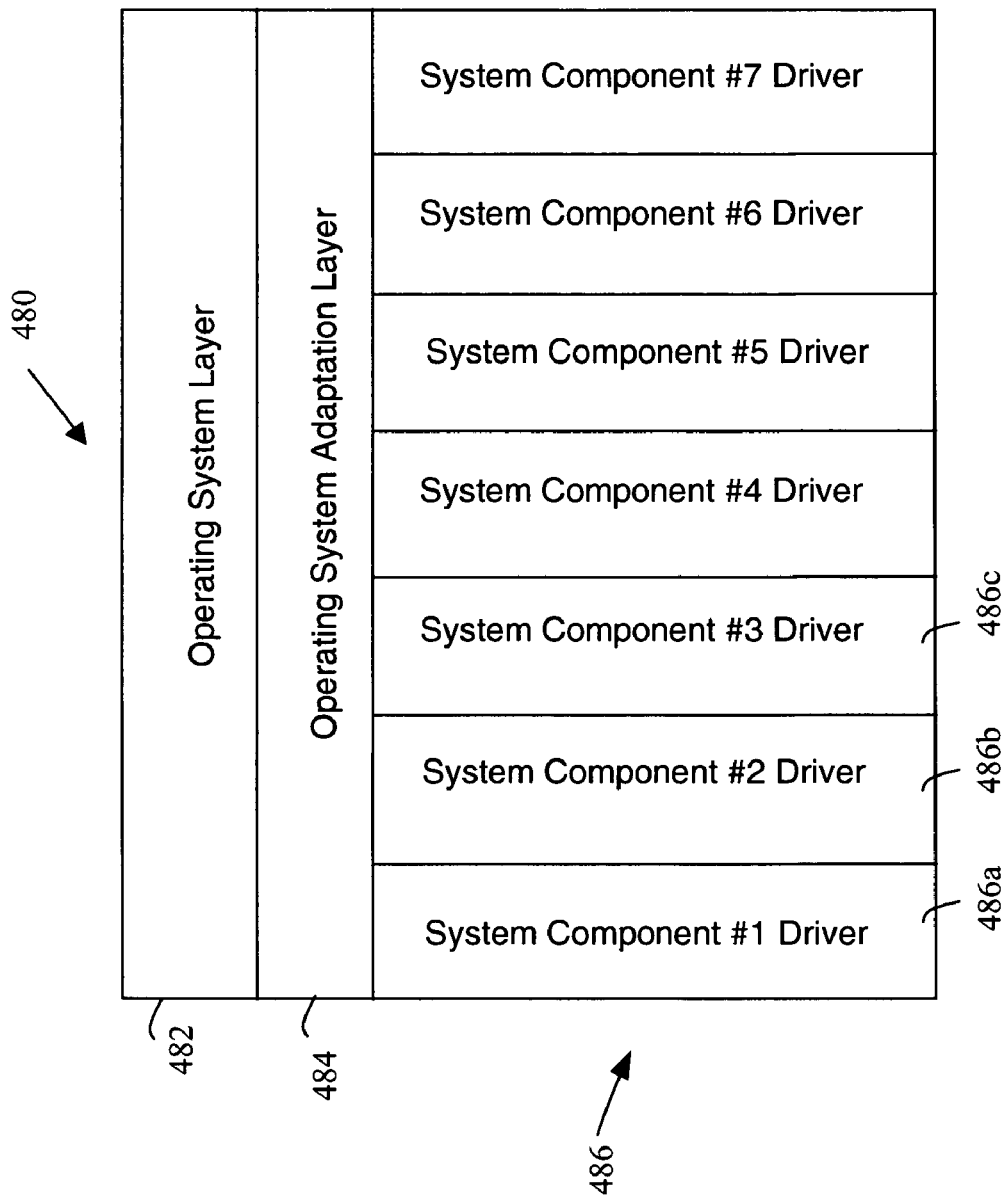
FIG. 5 depicts an interface for integrating software system component cores in accordance with the inventive arrangements.

FIG. 5 depicts an interface 480, for integrating software system component cores in accordance with the inventive arrangements. Referring to FIG. 5, there are shown an operating system layer 482, and operating system adaptation layer 484 and a system component layer 486. The operating system component layer 482 can facilitate management of resources for the software system components that are used to customize the FPGA-based SoC. The operating system layer 482 can host an operating system such as a RTOS.

The operating system adaptation layer 484 can facilitate communication between disparate system component drivers, for example 486a, 486b 486c, and the operating system layer 482. The system component drivers 486a, 486b and 486c can be customer specific proprietary cores, each having a different communication interface. Since each of the component drivers 486a, 486b and 486c can have different proprietary interfaces, communication messages can be translated or converted to and from the proprietary formats to facilitate communication with the operating system layer 480. The operating system adaptation layer 484 can include a translator that can facilitate conversion to and from the proprietary formats, so that information can be communicated between the operating system layer 482 and the system component layer 486.

The system component layer 486 can include one or more system component drivers. Each of the system component drivers can be configured to handle the processing functions for a system component. For example, system component #1 driver can be configured to handle processing functions for system component #1. For illustrative purposes, system component #1 can represent serial device 215j. In this case, system component #1 driver 486a can be used to process data in an associated data buffer for serial device 215j. System component #1 driver 486 can include an interrupt handling routine that can be used to retrieve data pending in the associated data buffer for serial device 215j.

Figure 6:
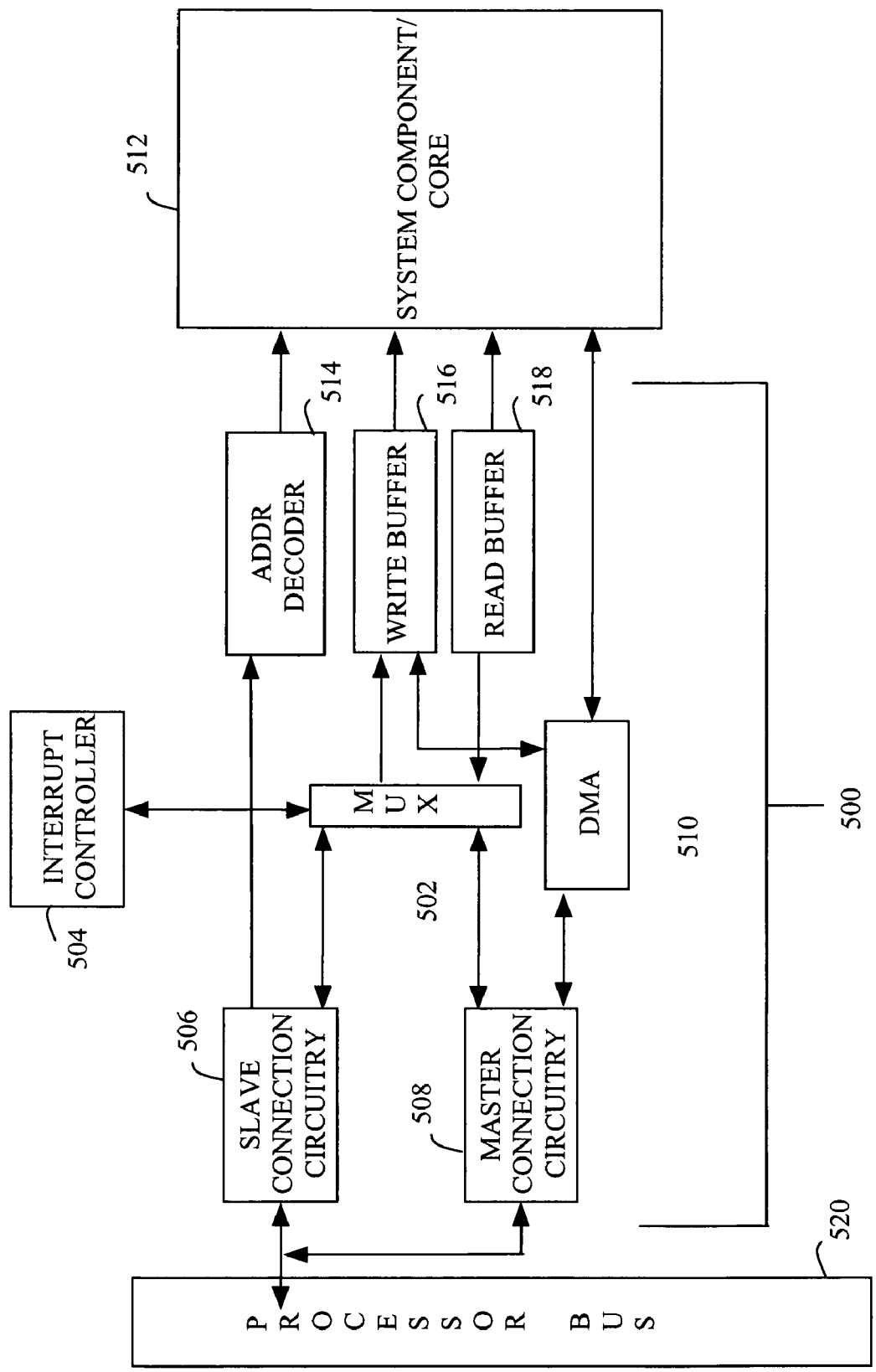
FIG. 6 depicts an exemplary hardware interface for integrating hardware system components in accordance with the invention.

FIG. 6 depicts an exemplary hardware interface for integrating hardware system components in accordance with the invention. Referring to FIG. 6, there is shown an exemplary interface 500 that can facilitate integration of variously configured peripheral system components that can be utilized for configuring the FPGA-based SoC. The FPGA-based SoC can be configured to utilize dedicated transistors in the Silicon of the FPGA for implementing a peripheral interface. Alternatively, the FPGA-based SoC can be configured to utilize dedicated transistors in the logic fabric of a FPGA for implementing a peripheral interface. Importantly, the choice of peripheral interfaces used for configuring the FPGA-based SoC can affect resource utilization of the FPGA-based SoC. For example, the resource utilization for a master-slave peripheral interface implementation can be markedly different from a slave only peripheral interface implementation. Advantageously, the invention can provide immediate feedback on system component and peripheral selection and implementation during customization of the FPGA-based SoC. Importantly, customization of the FPGA-based SoC can occur under resource constraints without the need to spend expensive development time and effort.

Exemplary interface 500 can include, but is not limited to, a multiplexer (MUX) 502, slave connection circuitry 506, master connection circuitry 508, direct memory access DMA) controller 510, interrupt controller 504, address decoder 514, write buffer 516, and read buffer 518. The MUX 502 can facilitate selection of the slave connection circuitry 506 or the master connection circuitry, which can be used to connect a proprietary or customer specific or other hardware system component core 512 to processor bus 520. The interrupt controller 504 latches individual interrupt signals and provides an indication of an interrupt condition to a processor (not shown). DMA controller 510 can facilitate direct memory access to a storage device such as a random access memory (RAM). I/O data transferred to and from the system component core can be buffered in the write buffer 516 and the read buffer 518, which can both be selected by the MUX 502.

In another aspect of the invention, a chip support package can be automatically created for the FPGA-based SoC. Typically, board support packages (BSP) can facilitate hardware and software customization. A BSP can include a circuit board and associated system and/or application software. The system and application software can include a collection of libraries, which typically isolate hardware functionality of the circuit board from its software functionality. For example, the BSP libraries can provide software functions that can be used for hardware initialization, interrupt handling, clock and timer management, and data structures for memory mapping and sizing. Nevertheless, a BSP usually correlates to a static design of a specific circuit board with specific components. A new circuit board with different components would then necessarily require a different BSP.

Advantageously, the FPGA-based SoC provides a more flexible approach than the BSP, by locating system components on a chip, in contrast to being on a separate circuit board. Rather than hard-coding the initialization of system components that reside on the circuit board of the BSP, the FPGA-based SoC can permit initialization of only those system components that are utilized for customizing the FPGA-based SoC. This can drastically reduce initialization time and save on often precious memory. The code generator 125 and/or system implementor 130, can include a chip support package generator for generating a chip support package (CSP) or a board support package generator for generating a board support package (BSP) once the system components used to customize the FPGA-based SoC have been selected and configured. The code generator (125) and/or system implementor (130) can serve as a tool to automate the creation of a BSP based on a specific FPGA-based SoC and a specific operating system to be integrated with the hardware or software cores previously selected.

Advantageously, the ability to get real-time feedback and resource allocation can provide optimal resource allocation while configuring the system components used to customize the FPGA-based SoC. Furthermore, the ability to automatically create a software interface (BSP/CSP) once the FPGA-based SoC is customized can significantly reduce up-front development costs and non-recurring engineering costs and ultimately reduces the time to market. A method for customizing the software of an FPGA-based SoC according to the present invention can be realized in a centralized fashion in one computer system, or in a distributed fashion where different elements are spread across several interconnected computer systems. Any kind of computer system, or other apparatus adapted for carrying out the methods described herein, is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

Additionally, the description above is intended by way of example only and is not intended to limit the present invention in any way, except as set forth in the following claims.

What is claimed is:

1. A method of generating a support package for a customized FPGA-based SoC, comprising the steps of:
   identifying an operating system for the customized FPGA-based SoC;

monitoring for at least one system component comprising a software core among a plurality of system components used for customizing the customized FPGA-based SoC during initialization of the customized FPGA-based SoC;

selecting parameters used to configure the at least one system component;

propagating the selected parameters for the at least one system component to a second system component of the plurality of system components to configure the second system component with the selected parameters;

performing a parameter consistency check for system components of the customized FPGA-based SoC to identify system component conflicts;

creating a software interface enabling communication between the operating system and the at least one system component based on the operating system for the customized FPGA-based SoC and the at least one system component and the selected parameters.

2. The method of claim 1, wherein the customized FPGA-based SoC is a customized FPGA-based embedded processor SoC.

3. A machine readable storage having stored thereon, a computer program having a plurality of code sections for providing a software interface for a customized FPGA-based SoC, said code sections executable by a machine for causing the machine to perform the steps of:

identifying an operating system for the customized FPGA-based SoC;

monitoring for at least one system component comprising a software core among a plurality of system components used for customizing the customized FPGA-based SoC during initialization of the customized FPGA-based SoC;

selecting parameters used to configure the at least one system component;

propagating the selected parameters for the at least one system component to a second system component of the plurality of system components to configure the second system component with the selected parameters;

performing a parameter consistency check for system components of the customized FPGA-based SoC to identify system component conflicts;

creating a software interface enabling communication between the operating system and the at least one system component based on the operating system for the customized FPGA-based SoC and the at least one system component and the selected parameters.

4. The computer program of claim 3, wherein the step of creating comprises the step of automatically generating a software interface to hardware functions selected from the group comprising hardware initialization, interrupt handling, interrupt generation, hardware clock management, hardware timer management, mapping of local and bus memory spaces, and memory sizing.

5. A method of generating a support package for a system including a customized FPGA-based SoC, the method comprising:

identifying an operating system for the customized FPGA-based SoC;

monitoring for at least one system component comprising a software core among a plurality of system components used for customizing the customized FPGA-based SoC during initialization of the customized FPGA-based SoC;

selecting parameters used to configure the at least one system component;

propagating the selected parameters for the at least one system component to a second system component of the plurality of system components to configure the second system component with the selected parameters;

performing a parameter consistency check for system components of the customized FPGA-based SoC to identify system component conflicts;

creating a software interface for the system enabling communication between the operating system and the at least one system component based on the operating system for the customized FPGA-based SoC and the at least one system component and the selected parameters.

6. The method of claim 5, wherein the system further includes a microprocessor coupled to the FPGA-based SoC.

7. The method of claim 5, wherein the FPGA-based SoC is an FPGA-based embedded processor SoC.

8. A machine readable storage having stored thereon, a computer program having a plurality of code sections for providing a software interface for a system including a customized FPGA-based SoC, the code sections executable by a machine for causing the machine to perform the steps of:

identifying an operating system for the customized FPGA-based SoC;

monitoring for at least one system component comprising a software core among a plurality of system components used for customizing the customized FPGA-based SoC during initialization of the customized FPGA-based SoC;

selecting parameters used to configure the at least one system component;

propagating the selected parameters for the at least one system component to a second system component of the plurality of system components to configure the second system component with the selected parameters;

performing a parameter consistency check for system components of the customized FPGA-based SoC to identify system component conflicts; creating a software interface for the system enabling communication between the operating system and the at least one system component based on the operating system for the customized FPGA-based SoC and the at least one system component and the selected parameters.

9. The machine readable storage of claim 8, wherein the system further includes a microprocessor coupled to the FPGA-based SoC.

10. The machine readable storage of claim 8, wherein the FPGA-based SoC is an FPGA-based embedded processor SoC.

* * * * *